United States Patent
Tanasa et al.

(10) Patent No.: US 10,271,169 B2
(45) Date of Patent: Apr. 23, 2019

(54) SYSTEM AND METHOD FOR ACCURATE LOCATION OF WIRELESS TERMINALS USING MOBILE INTERROGATION DEVICE

(71) Applicant: Verint Systems Ltd., Herzliya Pituach (IL)

(72) Inventors: Constantin Tanasa, Limassol (CY); Aleksandar Bozic, Limassol (CY); Slobodan Ninkov, Limassol (CY); Nicolas Marcou, Paphos (CY)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 0 days.

(21) Appl. No.: 15/869,401

(22) Filed: Jan. 12, 2018

(65) Prior Publication Data

US 2018/0206074 A1    Jul. 19, 2018

Related U.S. Application Data

(63) Continuation of application No. 14/712,863, filed on May 14, 2015, now Pat. No. 9,872,141.

(51) Int. Cl.
*H04W 24/00* (2009.01)
*H04W 4/02* (2018.01)

(52) U.S. Cl.
CPC ........... *H04W 4/023* (2013.01); *H04W 4/027* (2013.01)

(58) Field of Classification Search
CPC ............................. H04W 4/023; H04W 4/027
USPC .............................. 455/456.1–456.3; 370/338
See application file for complete search history.

(56) References Cited

U.S. PATENT DOCUMENTS

| | | | |
|---|---|---|---|
| 7,374,096 | B2 | 5/2008 | Overhultz et al. |
| 8,215,546 | B2 | 7/2012 | Lin et al. |
| 8,351,900 | B2 | 1/2013 | Lotvonen et al. |
| 8,496,169 | B2 | 7/2013 | Christofferson |
| 2008/0150698 | A1* | 6/2008 | Smith ............... G06K 19/0723 340/10.4 |

(Continued)

FOREIGN PATENT DOCUMENTS

WO    2010/116292    10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Marcos Batista
(74) *Attorney, Agent, or Firm* — Meunier Carlin & Curfman

(57) ABSTRACT

A method includes moving an interrogation device through multiple geographical positions. At each geographical position of the interrogation device, a wireless communication terminal is solicited to establish temporary communication with the interrogation device, and a value indicative of a distance between the wireless communication terminal and the interrogation device is estimated using the temporary communication. A geographical location of the wireless communication terminal is calculated based on multiple estimated values corresponding to the respective multiple geographical positions of the interrogation device.

18 Claims, 2 Drawing Sheets

(56) References Cited

U.S. PATENT DOCUMENTS

| | | | | |
|---|---|---|---|---|
| 2009/0036143 | A1* | 2/2009 | Martin | H04W 24/00 |
| | | | | 455/456.2 |
| 2011/0080267 | A1* | 4/2011 | Clare | G01S 13/82 |
| | | | | 340/10.4 |
| 2012/0256730 | A1* | 10/2012 | Scott | G01S 5/0221 |
| | | | | 340/10.1 |
| 2014/0148196 | A1* | 5/2014 | Bassan-Eskenazi | G01S 11/02 |
| | | | | 455/456.1 |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

Barkan, E.P., "Cryptanalysis of Ciphers and Protocols," Research Thesis submitted to the Senate of the Technion, Israel Institute of Technology, 2006, 200 pages.

"Cell Scanning and Catcher Detection in unnoticeable pocket size," NetHawk C2, Data sheet, version 1.4, EXFO, 2010, 4 pages.

Cellusys, "SS7 Vulnerabilities," e-book, 2016, 53 pages.

Engel, T., "SS7: Locate. Track. Manipulate." 2014, 55 pages.

Girardin, F., et al., "Detecting air travel to survey passengers on a worldwide scale," Journal of Location Based Services, 2010, 26 pages.

Kostrzewa, A., "Development of a man in the middle attack on the GSM Um-Interface," Master Thesis, 2011, 88 pages.

Meyer, U., et al., "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, 2004, pp. 2876-2883.

Mourad, H., "The Fall of SS7—How Can the Critical Security Controls Help?" The SANS Institute, 2015, 29 pages.

Nohl, K., "Mobile self-defense," Security Research Labs, 2015, 24 pages.

Radiator, EAP-SIM, EAP-AKA and EAP-AKA Support, White Paper, Open System Consultants Pty.Ltd., 2014, 17 pages.

Signaling System 7 (SS7) Security Report, Positive Technologies, 2014, 15 pages.

Strobel, D., "IMSI Catcher," Seminararbeit, Ruhr-Universität Bochum, 2007, pp. 13-24.

Vedaldi, A., "An implementation of SIFT detector and descriptor," University of California at Los Angeles, 2007, 7 pages.

* cited by examiner

# SYSTEM AND METHOD FOR ACCURATE LOCATION OF WIRELESS TERMINALS USING MOBILE INTERROGATION DEVICE

CROSS-REFERENCE TO RELATED APPLICATIONS

The present application is a continuation of U.S. patent application Ser. No. 14/712,863, filed on May 14, 2015, the disclosure of which is hereby incorporated herein by reference in its entirety.

FIELD OF THE DISCLOSURE

The present disclosure relates generally to wireless network monitoring, and particularly to methods and systems for locating wireless terminals.

BACKGROUND OF THE DISCLOSURE

Various types of monitoring systems are used for tracking and/or collecting information on cellular phones or other wireless communication terminals. Some monitoring systems solicit a tracked terminal to reveal its International Mobile Subscriber Identifier (IMSI). Such systems are commonly referred to as "IMSI catchers."

Examples of IMSI catching techniques are described, for example, by Strobel in "IMSI Catcher," Jul. 13, 2007, by Asokan et al., in "Man-in-the-Middle Attacks in Tunneled Authentication protocols," the 2003 Security Protocols Workshop, Cambridge, UK, Apr. 2-4, 2003, and by Meyer and Wetzel in "On the Impact of GSM Encryption and Man-in-the-Middle Attacks on the Security of Interoperating GSM/UMTS Networks," proceedings of the $15^{th}$ IEEE International Symposium on Personal, Indoor and Mobile Radio Communications, Barcelona, Spain, Sep. 5-8, 2004, pages 2876-2883, which are all incorporated herein by reference.

SUMMARY OF THE DISCLOSURE

An embodiment that is described herein provides a method including moving an interrogation device through multiple geographical positions. At each geographical position of the interrogation device, a wireless communication terminal is solicited to establish temporary communication with the interrogation device, and a value indicative of a distance between the wireless communication terminal and the interrogation device is estimated using the temporary communication. A geographical location of the wireless communication terminal is calculated based on multiple estimated values corresponding to the respective multiple geographical positions of the interrogation device.

In some embodiments, estimating the value includes estimating a Round-Trip Time (RTT) of the temporary communication. In an embodiment, the method includes measuring respective coordinates of the interrogation device at the geographical positions, and calculating the geographical location of the wireless communication terminal includes deriving the geographical location from the estimated values and the measured coordinates of the interrogation device.

In some embodiments, estimating the value includes, at a given geographical position of the interrogation device, receiving from the wireless communication terminal a signal that includes multiple multipath components, selecting a multipath component having a shortest propagation time among the multipath components, and estimating the value based on the selected multipath component. In an example embodiment, receiving the signal includes receiving the multipath components by respective processing chains of a rake receiver, and selecting the multipath component includes selecting an output of one of the processing chains.

In an embodiment, the method includes estimating respective velocities of the interrogation device at one or more of the geographical positions, and calculating the geographical location includes computing the geographical location of the wireless communication terminal based on the estimated values and the estimated velocities.

There is additionally provided, in accordance with an embodiment that is described herein, an apparatus including a transceiver and one or more processors. The transceiver is configured to solicit a wireless communication terminal to establish temporary communication with the interrogation device, and to estimate, using the temporary communication, a value that is indicative of a distance between the wireless communication terminal and the interrogation device. The processors are configured to receive multiple values that were estimated at multiple respective geographical positions of the interrogation device, and to calculate a geographical location of the wireless communication terminal based on the multiple estimated values.

The present disclosure will be more fully understood from the following detailed description of the embodiments thereof, taken together with the drawings in which:

DETAILED DESCRIPTION OF EMBODIMENTS

Overview

Embodiments that are described herein provide improved methods and systems for tracking the geographical locations of mobile phones and other wireless communication terminals. In the disclosed embodiments, a location-tracking system comprises an interrogation device that is configured to imitate the operation of a base station, and to solicit wireless communication terminals to establish temporary communication in order to monitor and track them.

In some embodiments, the location of a wireless terminal of interest is tracked by moving the interrogation device through multiple geographical positions. At each geographical position, the interrogation device establishes temporary communication with the wireless terminal, and estimates a value that is indicative of the distance between the wireless terminal and the interrogation device. The value may comprise, for example, the Round-Trip Time (RTT) between the terminal and the interrogation device. In addition, the interrogation device typically records its own location coordinates when each value is measured, e.g., using a Global Positioning System (GPS) receiver.

The outcome of the above process is a set of estimated values, e.g., RTTs, and corresponding coordinates of the interrogation device. In some embodiments, a controller or processor of the location-tracking system (internal or external to the interrogation device) calculates the location of the wireless terminal based on the estimated values and respective interrogation device coordinates.

By aggregating measurements over multiple locations of the interrogation device, the location-tracking system is able to locate wireless terminals with high accuracy, e.g., on the order of several meters. This accuracy is comparable with the accuracy of an array of interrogation devices that are distributed geometrically with respect to the wireless terminal. At the same time, this performance is achieved using only a single interrogation device, enabling the location-tracking system to be kept small, low-cost, portable and inconspicuous.

System Description

Figure 1:
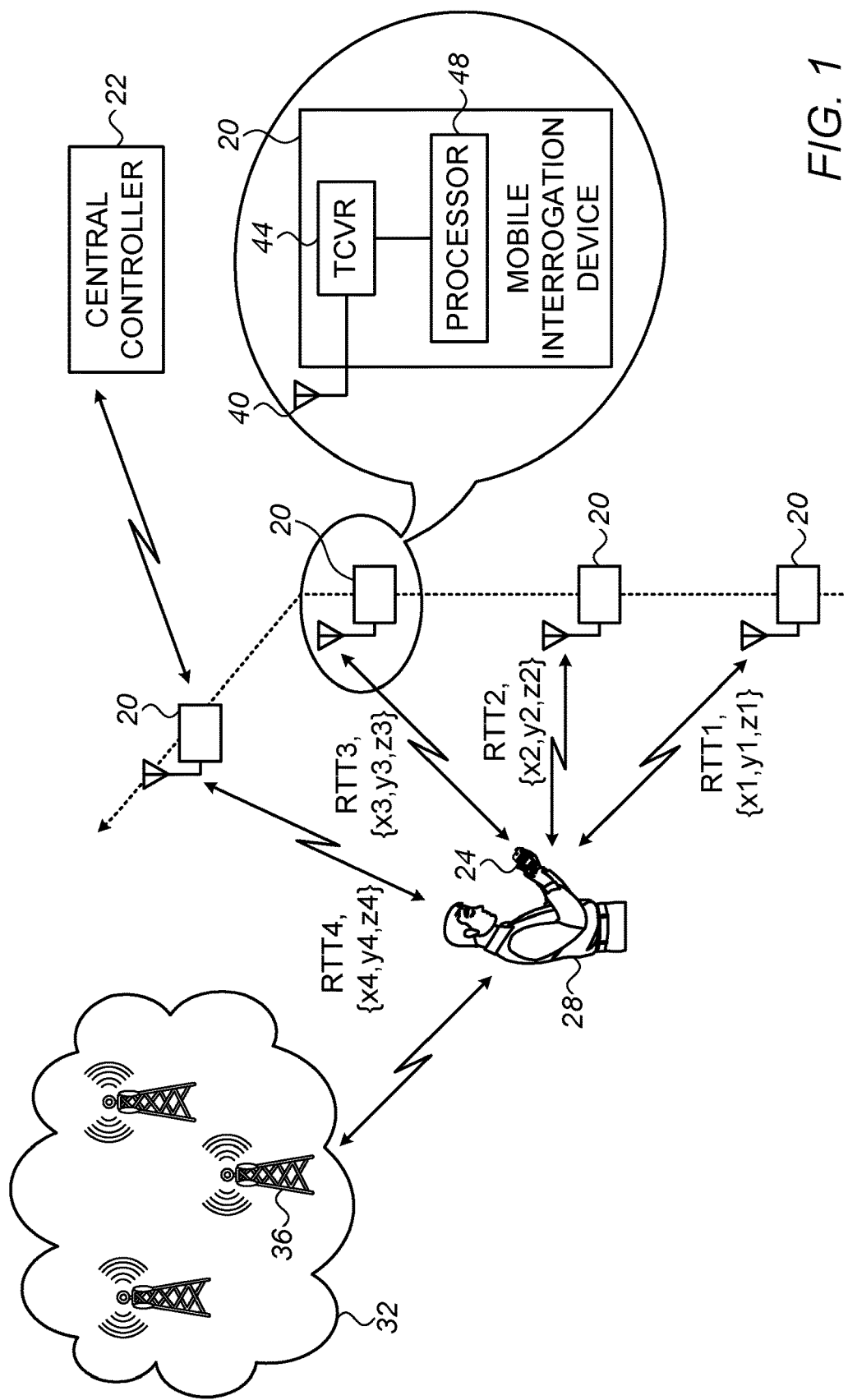
FIG. 1 is a block diagram that schematically illustrates a system for locating wireless communication terminals, in accordance with an embodiment that is described herein.

FIG. 1 is a block diagram that schematically illustrates a location-tracking system for locating wireless communication terminals 24, in accordance with an embodiment that is described herein. The disclosed system can be used, for example, for tracking users 28 who operate terminals 24. Such a system may be used, for example, by network operators for monitoring their subscriber activity or network performance, or by law enforcement agencies for monitoring of users of interest.

Terminals 24 communicate with a wireless communication network 32 via one or more base stations 36. Terminals 24 may comprise, for example, cellular phones, smartphones, wireless-enabled mobile computing devices, or any other suitable type of terminals. Terminals 24 are also referred to herein as User Equipment (UE).

Network 32 may operate in accordance with any suitable communication protocol, such as, for example, Global System for Mobile telecommunication (GSM), Universal Mobile Telecommunication System (UMTS), Code-Division Multiple Access (CDMA), iDEN, WiMAX (IEEE 802.16), Long-Term Evolution (LTE), or any other suitable protocol.

The location-tracking system comprises an interrogation device 20, which is configured to solicit selected terminals 24 to establish temporary communication with device 20, by imitating the operation of a base station. Device 20 may solicit a terminal to communicate in various ways, which may depend on the wireless protocol or protocols, supported by the terminal and the transceiver.

For example, in some network types the terminal measures the signals transmitted by base stations that are within range, and maintains a list of base stations that are candidates for hand-off. The terminal may decide to switch from its current serving base station to another base station based on various criteria, such as based on signal strength and/or on predefined priorities assigned to the base stations. Thus, in some embodiments device 20 may solicit a terminal 24 by transmitting at a high power level and/or using a directional antenna, so that the transmission of device 20 will be received by the terminal at higher signal strength and/or better signal quality than base stations 36 of network 32. In such cases, the terminal is likely to attempt reselection to the transceiver.

In alternative embodiments, the different base stations are assigned priorities, and the terminal chooses the serving base station in accordance with their power and priorities. In these embodiments, device 20 may be configured to imitate a base station having higher priority than base stations 36 of network 32 in order to solicit the terminal.

In some embodiments, after soliciting a terminal, device 20 may force the terminal to transmit signals on specified channels. During this procedure, device 20 extracts the desired information and performs the desired measurements. Such a process is typically unnoticeable to the user.

Having solicited a given terminal to communicate, device 20 typically extracts information regarding the solicited terminal. Such information may comprise, for example, the International Mobile Subscriber Identity (IMSI), Temporary Mobile Subscriber Identity (TMSI) and/or International Mobile Equipment Identity (IMEI) of the terminal, a time stamp indicating the time at which communication took place, call content, SMS content and/or any other suitable information. In the disclosed techniques, device 20 also estimates the distance from the solicited terminal, and this estimate is subsequently used for calculating the terminal's geographical location.

In the example of FIG. 1, interrogation device 20 comprises an antenna 40 for communicating with solicited terminals 24, a transmitter-receiver (transceiver) 44 and a processor 48. Transceiver 44 typically carries out the various transmission and reception functions of the interrogation device. Processor 48 carries out various computation functions of device 20. In the present example, the system further comprises a central controller 22 that receives the measurements acquired by device 20, and uses them to calculate the geographical locations of solicited terminals. Central controller 22 is connected to device 20, for example using a suitable wireless link or even over network 32.

The system configuration shown in FIG. 1 is an example configuration that is chosen purely for the sake of conceptual clarity. In alternative embodiments, any other suitable system configuration can be used. For example, in the example of FIG. 1 the computation functions are partitioned between processor 48 and central controller 22. In alternative embodiments, however, the functions of central controller 22 may be implemented entirely in processor 48, such that the entire system functionality is self-contained within interrogation device 20. In the context of the present patent application and in the claims, the functions of processor 48 and central controller 22 may generally be performed by one or more processors, internal and/or external to the interrogation device.

As another example, the disclosed techniques may also be carried out using two or more interrogation devices similar to device 20, each capable of moving through a respective plurality of geographical positions. The measurements acquired by the multiple interrogation devices may be processed jointly by central controller 22, so as to calculate the location of a terminal of interest.

Certain elements of the location-tracking system and of device 20 and controller 22 can be implemented using hardware, such as using one or more Application-Specific Integrated Circuits (ASICs), Field-Programmable Gate Arrays (FPGAs), Digital Signal Processors (DSPs) or other device types. Additionally or alternatively, certain elements can be implemented using software, or using a combination of hardware and software elements. In some embodiments, processor 48 and/or controller 22 comprise one or more general-purpose processors, which is programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Accurate Location Tracking Using Mobile Interrogation Device

In some embodiments, interrogation device 20 is mobile or portable, i.e., capable of moving through different geographical positions. For example, the interrogation device may be installed in a vehicle such as a car, in an airborne platform such as an Unmanned aerial vehicle (UAV), in a suitcase or other hand-portable configuration for carrying by an operator, or in any other suitable way.

In order to estimate the location of a terminal 24 accurately, interrogation device 20 is moved through multiple geographical positions. In the example of FIG. 1, device 20 is moved through four geographical positions along a certain path (marked with a dashed arrow). In real-life scenarios, the number of positions may be considerably larger. One possible implementation would consider the 5-7 most recent positions.

At each geographical position, transceiver 44 of device 20 establishes temporary communication with the terminal in question. While communicating with the terminal, transceiver 44 estimates a value that is indicative of the distance to the terminal.

In some embodiments, the value comprises a Round-Trip Time (RTT) between the terminal and the interrogation device. In UMTS networks, for example, the protocol supports measurement of RTT, which is defined as $RTT=T_{RX}-T_{TX}$, wherein $T_{TX}$ denotes the time of the beginning of the transmission of a downlink Dedicated Physical Channel (DPCH), and $T_{RX}$ denotes the time of the beginning of the reception of the corresponding uplink Dedicated Physical Control Cannel (DPCCH). RTT measurements typically imply an accuracy of several tens of meters.

Other possible values may comprise, for example, Time Advance (TA) values used in GSM networks, or even received signal strength. TA measurements typically imply an accuracy of 500-1000 meters. Further alternatively, device 20 may estimate any other suitable value that is indicative of the distance to the solicited terminal. The description that follows focuses on RTT, for the sake of clarity.

In addition to the RTT, device 20 measures and records its own location at each geographical position in which RTT is measured. In a typical embodiment, device 20 comprises a Global Positioning System (GPS) receiver, and processor 48 records the coordinates measured by the GPS receiver for each geographical position in which RTT is measured.

The outcome of the above process is a set of estimated values, e.g., RTTs, and corresponding coordinates of the interrogation device. Each RTT, and corresponding coordinates, was obtained at a different time. In the simplified example of FIG. 1, processor 48 delivers to central controller 22 a set of four measurements for the four geographical positions used by device 20:

RTT1, {x1,y1,z1}
RTT2, {x2,y2,z2}
RTT3, {x3,y3,z3}
RTT4, {x4,y4,z4}

In some embodiments, central controller 22 calculates the location of wireless terminal 24 based on the estimated RTTs and respective interrogation device coordinates. For example, given the finite accuracy of the RTT measurement, each data point above typically defines a two-dimensional (2-D) or three-dimensional (3-D) doughnut-shaped volume in which the terminal is likely to be located. The center of this region is at the geographical position of device 20, and its radius corresponds to the RTT value. The location of wireless terminal 24 can be found by intersecting the different regions in 2-D or 3-D. In alternative embodiments, central controller 22 may calculate the location of wireless terminal 24, for example, using a probabilistic distribution of the location of terminal 24 based on distance and addition of these probabilities (sometimes shown as a heat-map representation).

In one embodiment, controller 22 translates each RTT value into a distance value, for example using a suitable propagation model. The controller then defines around each geographical position of device 20 a sphere, whose radius is the distance value derived from the RTT measured at that position. The controller finds the intersection of the spheres, which is the desired estimate of the terminal's location. Note that the multiple spheres will typically not all intersect at a single point, e.g., due to measurement noise and calculation inaccuracies. The controller may thus find a region that best matches the intersection of the spheres.

In the above example, the measured coordinates of device 20 are three-dimensional, and controller 22 calculates the intersection of three-dimensional spheres. In alternative embodiments, the coordinates and location calculations may be performed in two dimensions only, e.g., by finding the intersection among circles.

In some embodiments, central controller 22 has access to a height map of the area of interest, e.g., a mapping from each {x,y} coordinate to the corresponding z-coordinate. In these embodiments, controller 22 may use the height map as additional information to increase the accuracy of the three- or two-dimensional location calculation. For example, the controller may further require that the three-dimensional coordinate of the terminal be located on or near the height map.

In some embodiments, at a given position of device 20, the uplink signal received from terminal comprises two or more multipath components. Each multipath component has propagated over a different path from terminal 24 to device 20, and therefore may have a different propagation time. The true distance from the terminal to the interrogation device should typically be derived from the multipath component having the shortest path (and thus smallest propagation time or earliest time-of-arrival). In some embodiments, transceiver 44 distinguishes between the different multipath components in the received signal, chooses the component corresponding to the smallest distance, and derives the RTT from that component.

In CDMA-based protocols, for example, transceiver 44 typically comprises a rake receiver. A rake receiver comprises multiple processing chains, referred to as fingers, each designated for receiving a respective multipath component of the received signal. In an embodiment, transceiver 44 chooses the finger corresponding to the smallest propagation time (earliest time-of-arrival), and derives the RTT from the output of that finger.

In some embodiments, in addition to measuring the geographical position of interrogation device 20 for each RTT measurement, device 20 also measures its velocity vector. In these embodiments, central controller 22 may derive the location of terminal 24 from the measured RTTs and the corresponding interrogation device positions and velocities.

Figure 2:
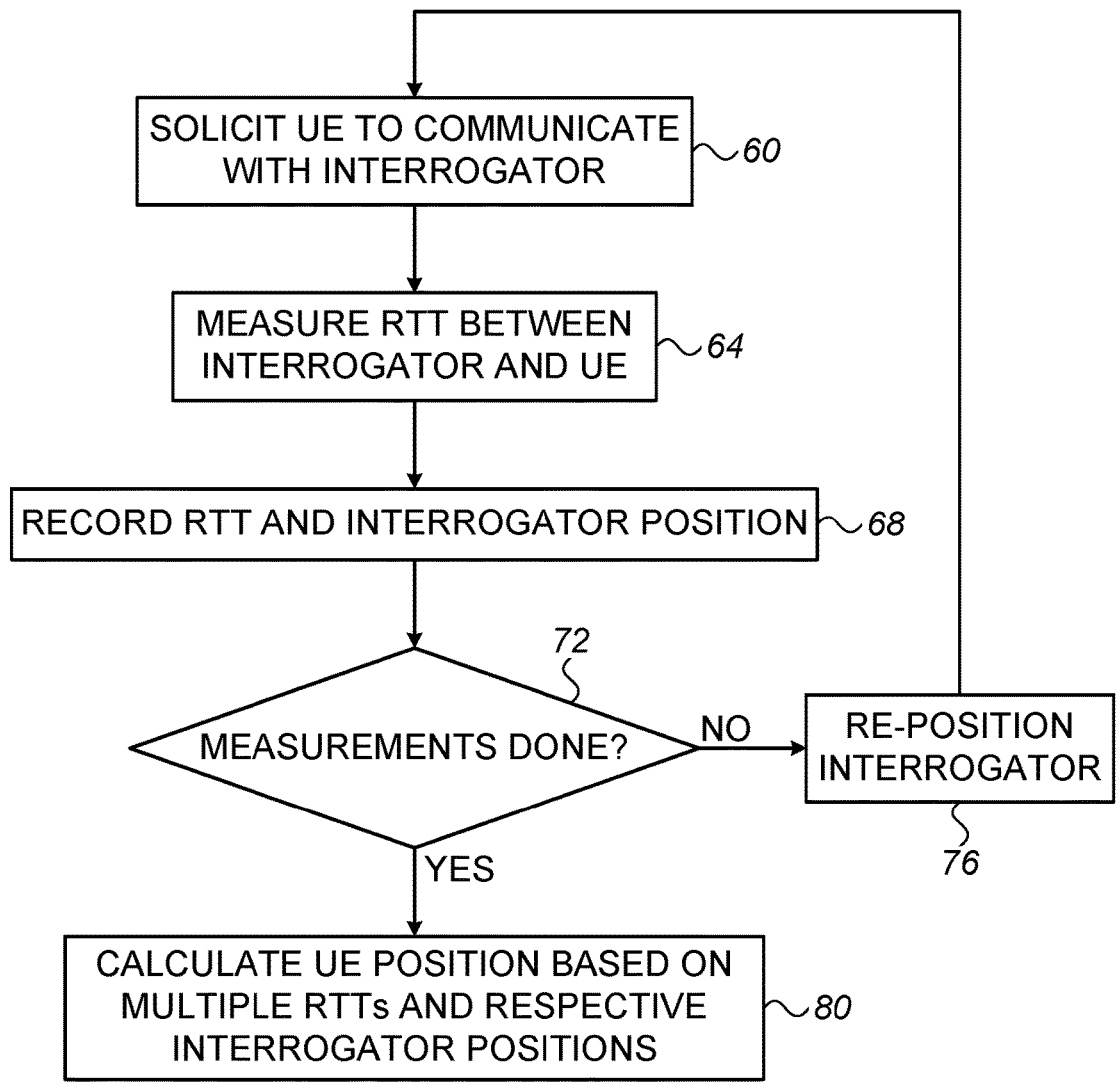
FIG. 2 is a flow chart that schematically illustrates a method for locating a wireless communication terminal, in accordance with an embodiment that is described herein.

FIG. 2 is a flow chart that schematically illustrates a method for locating a wireless communication terminal 24, in accordance with an embodiment that is described herein. The method begins with interrogation device 20 positioned at some initial geographical position.

Transceiver 44 of device 20 solicits terminal 24 to communicate, at a solicitation step 60. While communicating with the solicited terminal, transceiver 44 extracts the RTT value, at an RTT extraction step 64. Processor 48 of device 20 records the RTT value in association with the position coordinates of the interrogation device, at a recordation step

68. Device 20 typically provides the RTT value and the corresponding position coordinates to central controller 22.

Processor 48 checks whether a sufficient number of measurements have been taken, at a termination checking step 72. If not, interrogation device 20 is re-positioned to the next geographical position, at a re-positioning step 76, and the method loops back to step 60 above. When the measurements are completed, central controller 22 calculates the location of terminal 24 based on the multiple RTTs and the corresponding position coordinates of device 20, at a calculation step 80.

Although the embodiments described herein mainly address network monitoring and lawful interception applications, the principles of the present disclosure can also be used in other applications, such as in test equipment for mobile service providers.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for locating a wireless communication terminal, the wireless communication terminal being configured to communicate with a wireless communication network via a base station of the wireless communication network, the method comprising:

moving a first interrogation device through a first set of multiple geographical positions in an area of interest, the first interrogation device being configured to imitate operation of the base station of the wireless communication network;

at each of the first set of geographical positions, the first interrogation device soliciting the wireless communication terminal of the wireless communication network to establish temporary communication with the first interrogation device by the interrogation device imitating the operation of the base station, and estimating, using the temporary communication with the first interrogation device, a value that is indicative of a distance between the wireless communication terminal and the first interrogation device;

moving a second interrogation device through a second set of multiple geographical positions in the area of interest, the second interrogation device being configured to imitate operation of the base station of the wireless communication network, wherein the second interrogation device is different than the first interrogation device and the second set of multiple geographic positions is different than the first set of multiple geographic positions;

at each of the second set of geographical positions, the second interrogation device soliciting the wireless communication terminal of the wireless communication network to establish temporary communication with the second interrogation device by the interrogation device imitating the operation of the base station, and estimating, using the temporary communication with the second interrogation device, a value that is indicative of a distance between the wireless communication terminal and the second interrogation device;

determining, by a central controller in communication with the first and second interrogation devices, a geographical location of the wireless communication terminal based on the estimated values that are indicative of a distance corresponding to the first and second set of multiple geographical positions of the first and second interrogation devices.

2. The method according to claim 1, wherein the values that are indicative of a distance between the wireless communication terminal and the first and second interrogation devices is a Round-Trip Time (RTT) of the temporary communication.

3. The method according to claim 1, further comprising at each of the first set of geographical positions, the first interrogation device measuring a coordinate of the first interrogation device; and at each of the second set of geographical positions, the second interrogation device measuring a coordinate of the second interrogation device;

wherein determining the geographical location of the wireless communication terminal is further based on the coordinates of the first and second interrogation devices.

4. The method according to claim 1, wherein estimating the value comprises, at a given geographical position of the first interrogation device, receiving by the first interrogation device a signal that comprises multiple multipath components, and selecting a multipath component having a shortest propagation time among the multiple multipath components.

5. The method according to claim 4, wherein receiving the signal by the first interrogation device comprises receiving the multiple multipath components by respective processing chains of a rake receiver.

6. The method according to claim 3, further comprising:

at each of the first set of geographical positions, the first interrogation device estimating a velocity of the first interrogation device; and at each of the second set of geographical positions, the second interrogation device estimating a velocity of the second interrogation device;

wherein determining the geographical location of the wireless communication terminal is further based on the estimated velocities of the first and second interrogation devices.

7. The method according to claim 1, wherein the first interrogation device soliciting the wireless communication terminal of the wireless communication network to establish temporary communication with the first interrogation device includes the first interrogation device transmitting at a power level higher than a power level of the base station such that the transmission of the first interrogation device will be received by the wireless communication terminal at a higher signal strength than a transmission sent from the base station.

8. The method according to claim 1, wherein a geographic region in which the wireless communication terminal is likely to be located is defined for each of the first and second sets of geographical positions, where the center of the region is a corresponding one of the first and second sets of geographic positions and the radius of the region is an estimated distance between the wireless communication terminal and a corresponding one of the first and second interrogation devices at the one of the first and second sets geographic positions, wherein the geographical location of the wireless communication terminal is at an intersection of the regions.

9. The method according to claim 8, wherein the geographical location of the wireless communication terminal is at the intersection of the regions that is also located on a height map in the area of interest.

10. An apparatus for locating a wireless communication terminal, the wireless communication terminal being configured to communicate with a wireless communication network via a base station of the wireless communication network, the apparatus comprising:
  a first transceiver, which is configured to solicit the wireless communication terminal of the wireless communication network to establish a temporary communication with the first transceiver by the transceiver imitating the operation of the base station of the wireless communication network, wherein the first transceiver is further configured to estimate, using the temporary communication, a value that is indicative of a distance between the wireless communication terminal and the first transceiver;
  a second transceiver, which is configured to solicit the wireless communication terminal of the wireless communication network to establish a temporary communication with the second transceiver by the transceiver imitating the operation of the base station of the wireless communication network, wherein the second transceiver is further configured to estimate, using the temporary communication, a value that is indicative of a distance between the wireless communication terminal and the second transceiver; and
  a central controller in communication with the first and second transceivers, wherein the central controller is configured to receive from the first transceiver the estimated value that is indicative of a distance between the wireless communication terminal and the first transceiver at a first set of geographical positions in an area of interest, wherein the central controller is configured to receive from the second transceiver the estimated value that is indicative of a distance between the wireless communication terminal and the second transceiver at a second set of geographical positions in the area of interest, wherein the central controller is configured to determine a geographical location of the wireless communication terminal based on the received estimated values that are indicative of a distance corresponding to the first and second set of geographical positions of the first and second transceivers.

11. The apparatus according to claim 10, wherein the values that are indicative of a distance between the wireless communication terminal and the first and second transceivers is a Round-Trip Time (RTT) of the temporary communication.

12. The apparatus according to claim 10, wherein the first transceiver is further configured to measure a coordinate of the first transceiver, wherein the second transceiver is further configured to measure a coordinate of the second transceiver, and wherein the controller is further configured to determine the geographical location of the wireless communication terminal based on the coordinates of the first and second transceivers at each of the first and second set of geographic positions.

13. The apparatus according to claim 10, wherein the first transceiver is configured to estimate the value at a given geographical position of the first transceiver, based on a received signal that comprises multiple multipath components, and a selected multipath component having a shortest propagation time among the multiple multipath components.

14. The apparatus according to claim 13, wherein the first transceiver comprises a rake receiver, wherein the multiple multipath components are received by respective processing chains of the rake receiver.

15. The apparatus according to claim 12, wherein the first transceiver is further configured to estimate a velocity of the first transceiver, wherein the second transceiver is further configured to estimate a velocity of the second transceiver, and wherein the central controller is further configured to determine the geographical location of the wireless communication terminal based on the estimated velocities of the first and second transceivers at each of the first and second set of geographic positions.

16. The apparatus according to claim 10, wherein the first transceiver is configured to transmit at a power level higher than a power level of the base station such that the transmission of the first transceiver will be received by the wireless communication terminal at a higher signal strength than a transmission sent from the base station.

17. The apparatus according to claim 10, wherein a geographic region in which the wireless communication terminal is likely to be located is defined for each of the first and second sets of geographical positions, where the center of the region is a corresponding one of the first and second sets of geographic positions and the radius of the region is an estimated distance between the wireless communication terminal and a corresponding one of the first and second transceivers at the one of the first and second sets geographic positions, wherein the geographical location of the wireless communication terminal is at an intersection of the regions.

18. The apparatus according to claim 17, wherein the geographical location of the wireless communication terminal is at the intersection of the regions that is also located on a height map in the area of interest.

* * * * *